United States Patent
Qian et al.

(10) Patent No.: US 12,460,744 B2
(45) Date of Patent: Nov. 4, 2025

(54) ASSEMBLY FOR PREVENTING CLAMPING STAGNATION OF VALVE ROD, AND VALVE STRUCTURE AND METHOD FOR PREVENTING CLAMPING STAGNATION OF VALVE ROD

(71) Applicant: ZHEJIANG UNIVERSITY, Zhejiang (CN)

(72) Inventors: Jinyuan Qian, Zhejiang (CN); Juan Mu, Zhejiang (CN); Zhenhao Lin, Zhejiang (CN); Zhijiang Jin, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 18/585,093

(22) Filed: Feb. 23, 2024

(65) Prior Publication Data
US 2024/0218941 A1    Jul. 4, 2024

Related U.S. Application Data

(63) Continuation of application No. PCT/CN2022/114333, filed on Aug. 23, 2022.

(30) Foreign Application Priority Data

Aug. 25, 2021    (CN) .......................... 202110979625.7

(51) Int. Cl.
*F16K 41/04*    (2006.01)
*F16K 1/54*    (2006.01)
*F16K 27/02*    (2006.01)

(52) U.S. Cl.
CPC ................ *F16K 41/04* (2013.01); *F16K 1/54* (2013.01); *F16K 27/02* (2013.01)

(58) Field of Classification Search
CPC ............. F16K 41/04; F16K 1/54; F16K 27/02
(Continued)

(56) References Cited

U.S. PATENT DOCUMENTS

| 1,350,378 | A | * | 8/1920 | Mueller | .................. | F16K 31/52 |
| | | | | | | 251/318 |
| 2,567,527 | A | * | 9/1951 | Parks | ..................... | F16J 15/184 |
| | | | | | | 277/540 |

(Continued)

FOREIGN PATENT DOCUMENTS

| CN | 2445148 | 8/2001 |
| CN | 101216114 | 7/2008 |

(Continued)

OTHER PUBLICATIONS

"International Search Report (Form PCT/ISA/210) of PCT/CN2022/114333," mailed on May 29, 2018, pp. 1-4.

(Continued)

*Primary Examiner* — John Bastianelli
(74) *Attorney, Agent, or Firm* — JCIPRNET

(57) ABSTRACT

Disclosed are an assembly for preventing clamping stagnation of a valve rod, and a valve structure and method for preventing clamping stagnation of a valve rod. The assembly for preventing clamping stagnation of a valve rod includes a rigid ring and an elastic ring. The rigid ring is coaxially sleeved in the elastic ring, and the inner wall of the rigid ring is of a straight cylindrical structure. A valve rod can move up and down along the inner wall of the rigid ring under the guidance of the rigid ring and forms a sliding pair together with the rigid ring. The joint between the rigid ring and the valve rod is closed. The assembly for preventing clamping stagnation of a valve rod is simple in structure, convenient to manufacture, and suitable for most valves having elongated valve rod structures.

12 Claims, 1 Drawing Sheet

(58) Field of Classification Search
USPC .................................................. 251/214, 318
See application file for complete search history.

(56) References Cited

U.S. PATENT DOCUMENTS

| | | | | |
|---|---|---|---|---|
| 3,869,155 | A | * | 3/1975 | Hutchison ............ H02G 3/0658 285/348 |
| 4,294,428 | A | * | 10/1981 | Okada ................... F16K 1/2268 251/307 |
| 4,509,719 | A | * | 4/1985 | Uomala .................. F16K 27/12 251/367 |
| 4,597,581 | A | * | 7/1986 | Nimberger ........... F16J 15/3268 277/553 |
| 5,297,777 | A | * | 3/1994 | Yie .......................... B24C 5/02 251/324 |

FOREIGN PATENT DOCUMENTS

| | | |
|---|---|---|
| CN | 204387424 | 6/2015 |
| CN | 208605683 | 3/2019 |
| CN | 211371292 | 8/2020 |
| CN | 212718022 | 3/2021 |
| CN | 113738925 | 12/2021 |
| DE | 202015104716 | 10/2015 |
| JP | 2011002031 | 1/2011 |
| JP | 2012149599 | 8/2012 |

OTHER PUBLICATIONS

"Written Opinion of the International Searching Authority (Form PCT/ISA/237) of PCT/CN2022/114333," mailed on May 29, 2018, pp. 1-4.

* cited by examiner

ASSEMBLY FOR PREVENTING CLAMPING STAGNATION OF VALVE ROD, AND VALVE STRUCTURE AND METHOD FOR PREVENTING CLAMPING STAGNATION OF VALVE ROD

CROSS-REFERENCE TO RELATED APPLICATIONS

This application is a continuation of international application of PCT application serial no. PCT/CN2022/114333, filed on Aug. 23, 2022, which claims the priority benefit of China application no. 202110979625.7, filed on Aug. 25, 2021. The entirety of each of the above-mentioned patent applications is hereby incorporated by reference herein and made a part of this specification.

TECHNICAL FIELD

The present disclosure relates to the field of a valve structure for preventing clamping stagnation of a valve rod, and in particular to an assembly for preventing clamping stagnation of a valve rod, and a valve structure and a method for preventing clamping stagnation of a valve rod.

DESCRIPTION OF RELATED ART

In a laterally arranged valve with a piston valve core structure, there is an obvious imbalance in the force applied on the bottom surface of the valve core. The uneven pressure distribution causes an unbalanced torque at the bottom of the valve core. The valve core will drive the valve rod to deflect under the action of unbalanced torque, which in turn causes extrusion between the valve rod and the valve cover. As a result, the valve rod is bent and deformed, which ultimately results in clamping stagnation of a vale rod.

Among the valve structures currently available on the market, there is a lack of improved designs to address the clamping stagnation problem of a valve rod caused by the unbalanced torque exerted on the valve core. In particular, there is a lack of a structure for preventing clamping stagnation of a valve rod and separating the valve rod from a valve cover contact surface. Chinese utility patent publication No. CN 211371292U discloses a new type of steam regulating valve. The structure connects the valve core and the flow plate through an elastic part. When the driving element on the upper part of the steam valve fails, the valve core moves downward under the action of gravity and the elastic part. Moreover, the pressure brought by the steam causes the valve core and the flow plate to fit tightly, so that the steam valve is always closed to prevent causing damage to the steam equipment and facilitate personnel to perform maintenance and repair. However, the valve rod and the valve cover of the valve structure still closely match each other. The valve rod and the valve cover are very likely to produce a large extrusion force, and the structure has a high complexity and low universality.

SUMMARY

The purpose of the present disclosure is to solve the problem of clamping stagnation of a valve rod caused by the imbalanced force applied to the valve core by providing an assembly for preventing clamping stagnation of a valve rod, and a valve structure and a method for preventing clamping stagnation of a valve rod.

The specific technical solutions adopted by the present disclosure are as follows:

In a first aspect, the present disclosure provides an assembly for preventing clamping stagnation of a valve rod, and the assembly includes a rigid ring and an elastic ring. The rigid ring is coaxially sleeved in the elastic ring, and the inner wall of the rigid ring is of a straight cylindrical structure. The valve rod is able to move up and down along the inner wall of the rigid ring under the guidance of the rigid ring and forms a sliding pair together with the rigid ring. The joint between the rigid ring and the valve rod is closed.

Preferably, the circumferential side of the outer wall of the rigid ring near the two ends extends outward to form an annular protrusion, and the inner wall of the elastic ring near two ends is recessed to form an annular groove; the rigid ring and the elastic ring are engaged and connected through the protrusion and the groove.

Preferably, the thickness of the elastic ring is greater than the thickness of the rigid ring.

In a second aspect, the present disclosure provides a valve structure for preventing clamping stagnation of a valve rod, and the valve structure includes an upper valve cover, a lower valve cover, a valve rod, and the assembly for preventing clamping stagnation of a valve rod as described in any one of the first aspects.

The upper valve cover and the lower valve cover are detachably connected and together form a valve cover assembly for closing a valve body. A vertical through hole is opened in the center of the valve cover assembly, and a valve rod is provided with a gap in the through hole. An annular hole is coaxially opened for configuring the assembly for preventing clamping stagnation of a valve rod at the joint between the upper valve cover and the lower valve cover, and the top and bottom of the assembly for preventing clamping stagnation of the valve rod are pressed against each other and limited through the upper valve cover and the lower valve cover. The outer wall of the elastic ring is an interference fit with the inner wall of the annular hole, and the rigid ring is sleeved on the outer wall of the valve rod and the joint is closed.

Preferably, the upper valve cover and the lower valve cover are detachably connected by bolts.

Preferably, a sealing ring is provided at the joint between the upper valve cover and the lower valve cover.

Preferably, the assembly for preventing clamping stagnation of the valve rod, the valve rod and the valve cover assembly are all disposed coaxially.

In a third aspect, the present disclosure provides a method for preventing clamping stagnation of a valve rod using the valve structure described in any one of the second aspect, and specifically as follows:

During the opening and closing process of the valve core, the flow of fluid in the valve is unevenly distributed. The valve core is subjected to the unbalanced force of the fluid during the movement process, and an unbalanced torque will be generated on the bottom surface. The valve core drives the valve rod to deflect under the action of unbalanced torque to prevent squeezing from being generated at one side of the assembly for preventing a clamping stagnation of the valve rod, thereby preventing the elastic ring of the assembly for preventing a clamping stagnation of the valve rod from shrinking and deforming under pressure. While buffering the deflection of the valve rod, it prevents deformation caused by extrusion between the valve rod and through hole wall in the valve cover assembly, thereby preventing clamping stagnation of the valve rod.

Compared with the related art, the present disclosure has the following advantageous effects:
1) The present disclosure leaves a gap between the valve rod and the valve cover assembly by disposing the assembly for preventing clamping stagnation of the valve rod, thereby preventing the inner annular surface of the assembly for preventing clamping stagnation of the valve rod from being tightly engaged with the valve rod. In this way, it is possible to guide the valve rod to move along the vertical direction while ensuring the sealing performance of the valve.
2) By arranging the assembly for preventing clamping stagnation of the valve rod consisting of the rigid ring and the elastic ring, when ensuring the normal movement of the valve rod and the sealing of the valve, it buffers the rigid contact between the valve rod and the valve cover assembly as well as the extrusion effect. In this way, the bending of valve rod caused by extrusion generated between the valve rod and the valve cover assembly under the action of unbalanced force may be avoided, and clamping stagnation of the valve rod may also be prevented.
3) The assembly for preventing clamping stagnation of a valve rod is simple in structure, convenient to manufacture, and suitable for most valves having elongated valve rod structures.

Figure 1:
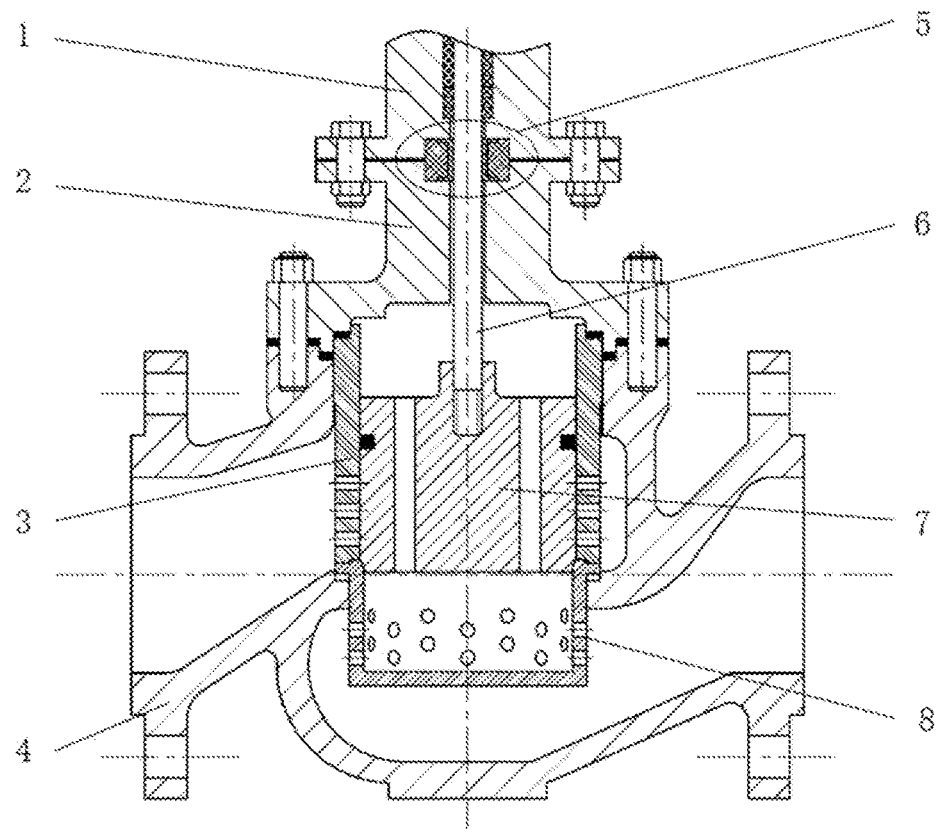
FIG. 1 is a cross-sectional view of the valve structure for preventing clamping stagnation of valve rod according to the present disclosure when the valve structure is closed.

In the drawings: 1. Upper valve cover; 2. Lower valve cover; 3. Valve cage; 4. Valve body; 5. Assembly for preventing clamping stagnation of valve rod; 5-1. Rigid ring; 5-2. Elastic ring; 6. Valve rod; 7. Valve core; 8. Valve base.

DESCRIPTION OF THE EMBODIMENTS

The present disclosure will be further elaborated and described below in conjunction with the accompanying drawings and specific embodiments. The technical features of various embodiments of the present disclosure can be combined accordingly as long as they do not conflict with each other.

The disclosure provides an assembly for preventing clamping stagnation of a valve rod. The assembly for preventing clamping stagnation of a valve rod is an annular structure as a whole. When in use, the assembly for preventing clamping stagnation of a valve rod is sleeved on the outside of the target valve rod so that the valve rod may be guided by the assembly for preventing clamping stagnation of a valve rod to move vertically so as to prevent clamping stagnation of the valve rod.

Figure 2:
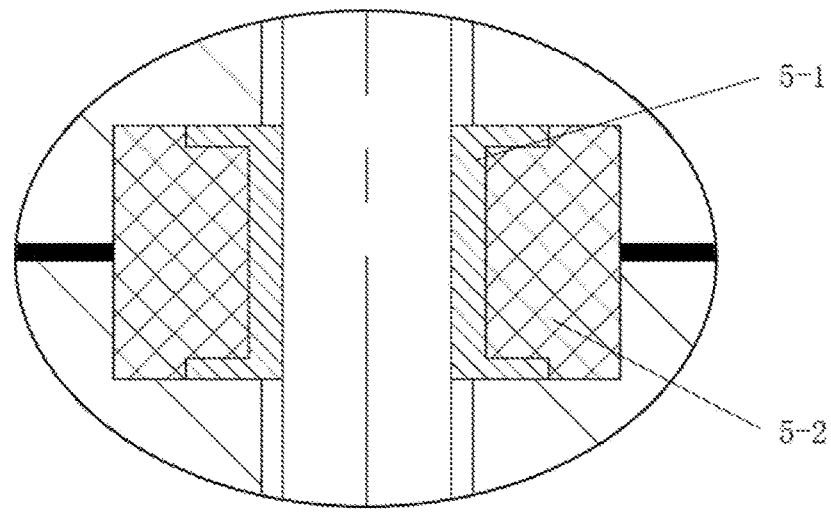
FIG. 2 is a partial enlarged view of the assembly for preventing clamping stagnation of a valve rod involved in the present disclosure.

As shown in FIG. 2, the assembly for preventing clamping stagnation of a valve rod mainly includes a rigid ring 5-1 and an elastic ring 5-2. The rigid ring 5-1 is coaxially sleeved in the elastic ring 5-2, and the rigid ring 5-1 is located inside the elastic ring 5-2. The inner wall of the rigid ring 5-1 is a straight cylindrical structure, which is disposed to guide the movement of the valve rod. Therefore, the valve rod may move up and down along the inner wall of the rigid ring 5-1. The valve rod forms a sliding pair together with the rigid ring 5-1. In the meantime, in order to ensure the air tightness of the valve, the joint between the rigid ring 5-1 and the valve rod should maintain closed.

In practical applications, in order to ensure the connection and coordination between the rigid ring 5-1 and the elastic ring 5-2, the circumferential side of the outer wall of the rigid ring 5-1 near the two ends may be extended outward horizontally to form an annular protrusion, and the inner wall of the elastic ring 5-2 near two ends is recessed to form an annular groove. That is to say, from the half of the axial cross-sectional view of the assembly for preventing clamping stagnation of a valve rod, the rigid ring 5-1 is in a concave structure, and the elastic ring 5-2 is in a convex structure. The rigid ring 5-1 and the elastic ring 5-2 may be engaged and connected through protrusions and grooves, and the elastic ring 5-2 may completely wrap the outer wall of the rigid ring 5-1. In order to achieve a better buffering effect, the thickness of the elastic ring 5-2 may be set to be greater than the thickness of the rigid ring 5-1.

The present disclosure provides a valve structure for preventing clamping stagnation of a valve rod, and the valve structure mainly includes an upper valve cover 1, a lower valve cover 2, a valve rod 6, and the assembly 5 for preventing clamping stagnation of a valve rod. The upper valve cover 1 and the lower valve cover 2 are detachably connected and together form a valve cover assembly for closing the valve body 4. A vertical through hole is opened in the center of the valve cover assembly along the central axis, and a valve rod 6 is disposed in the through hole. That is to say, the valve rod 6 penetrates the upper valve cover 1 and the lower valve cover 2. There is a gap between the valve rod 6 and the through hole wall, and there is a gap fit between the valve rod 6 and the through hole. An annular hole is coaxially opened for configuring the assembly 5 for preventing clamping stagnation of a valve rod at the joint between the upper valve cover 1 and the lower valve cover 2, and the top and bottom of the assembly 5 for preventing clamping stagnation of the valve rod are pressed against each other and limited through the upper valve cover 1 and the lower valve cover 2. In practical applications, the upper half of the annular hole may be opened at the bottom center of the upper valve cover 1, and the lower half of the annular hole may be opened at the top center of the lower valve cover 2. Such configuration is to facilitate the placement and arrangement of the assembly 5 for preventing clamping stagnation of a valve rod into the annular hole. After the assembly 5 for preventing clamping stagnation of a valve rod is placed into the annular hole, the outer wall of the elastic ring 5-2 interferes with the inner wall of the annular hole, and the rigid ring 5-1 is sleeved on the outer wall of the valve rod 6 and the joint is closed.

In actual application, the upper valve cover 1 and the lower valve cover 2 may be detachably connected by bolts. In order to achieve better valve sealing effect, a sealing ring is disposed at the joint between the upper valve cover 1 and the lower valve cover 2. The assembly 5 for preventing clamping stagnation of a valve rod, the valve rod 6 and the valve cover assembly are all disposed coaxially.

The assembly for preventing clamping stagnation of a valve rod is suitable for most valves having elongated valve rod structures. As shown in FIG. 1, FIG. 1 shows a valve structure to which the assembly for preventing clamping stagnation of a valve rod of the present disclosure may be applied. The main structure of the valve structure includes an upper valve cover 1, a lower valve cover 2, a valve body 4, a valve cage 3, a valve base 8, a valve core 7, a valve rod 6 and an assembly 5 for preventing clamping stagnation of a valve rod. The valve cage 3 is a sleeve structure with a throttling hole in the lower part. The upper and lower end surfaces are step surfaces, which match the valve body 4 and the valve base 8 respectively. The inner annular surface of the valve cage 3 contacts the valve core 7 and guides the valve core 7 simultaneously. The valve base 8 is a cylindrical structure with a bottom surface, located below the valve cage 3 and the valve core 7, disposed to support the fully closed position of the valve core 7, and has through holes around the valve base 8. The valve core 7 is a cylindrical structure with upper and lower through holes inside, the upper end is threadedly connected to the valve rod 6, the lower end thereof is in contact with the valve base 8 in the fully closed position, and the peripheral surface thereof is in contact with the inner annular surface of the valve cage 3. The valve rod 6 has a rod-shaped structure with an external thread at the lower end and is threadedly connected to the valve core 7. The diameter of the valve rod 6 is slightly smaller than the diameter of the internal through holes of the upper valve cover 1 and the lower valve cover 2.

Taking the valve structure shown in FIG. 1 as an example, the specific method of using the valve structure to prevent clamping stagnation of a valve rod is as follows: during the opening and closing process of the valve core 7, the flow of fluid in the valve will be unevenly distributed. Therefore, the valve core 7 will receive an unbalanced force from the fluid during the opening and closing process, and an unbalanced torque will be generated on the bottom surface of the valve core 7. The valve core 7 will drive the valve rod 6 to deflect under the action of the unbalanced torque to prevent squeezing from being generated at one side of the assembly 5 for preventing a clamping stagnation of the valve rod, thereby preventing the elastic ring 5-2 of the assembly 5 for preventing a clamping stagnation of the valve rod from shrinking and deforming under pressure. In this way, while the assembly 5 for preventing clamping stagnation of a valve rod buffers the deflection of the valve rod 6, it prevents deformation caused by extrusion between the valve rod 6 and through hole wall in the valve cover assembly, thereby preventing clamping stagnation of the valve rod.

In a general valve structure, there is no gap between the valve rod 6 and the internal channel of the valve cover and they fit closely. When the valve core 7 opens and closes, the uneven distribution of fluid in the valve causes the valve core 7 to receive uneven fluid force. An unbalanced torque will be generated on the bottom surface of the valve core 7. The valve core 7 will drive the valve rod 6 to deflect under the unbalanced torque, causing extrusion between the valve rod 6 and the valve covers 1 and 2, and causing the valve rod 6 to bend and deform, which ultimately results in clamping stagnation of the valve rod 6. In the present disclosure, by arranging the assembly for preventing clamping stagnation of the valve rod consisting of the rigid ring and the elastic ring, when ensuring the normal movement of the valve rod and the sealing of the valve, it buffers the rigid contact between the valve rod and the valve cover assembly as well as the extrusion effect. In this way, the bending of valve rod caused by extrusion generated between the valve rod and the valve cover assembly under the action of unbalanced force may be avoided, and clamping stagnation of the valve rod may also be prevented.

The above-described embodiment is only a preferred solution of the present disclosure, but it is not intended to limit the present disclosure. Those of ordinary skill in the relevant technical fields may also make various changes and modifications without departing from the spirit and scope of the present disclosure. Therefore, any technical solution obtained by adopting equivalent substitution or equivalent transformation shall fall within the protection scope of the present disclosure.

What is claimed is:

1. An assembly for preventing clamping stagnation of a valve rod, wherein comprising a rigid ring and an elastic ring, the rigid ring is coaxially sleeved in the elastic ring, and an inner wall of the rigid ring is of a straight cylindrical structure; the valve rod is able to move up and down along the inner wall of the rigid ring under a guidance of the rigid ring and forms a sliding pair together with the rigid ring; a joint between the rigid ring and the valve rod is closed,
    wherein a circumferential side of an outer wall of the rigid ring near two ends extends outward to form an annular protrusion, and the inner wall of the elastic ring near two ends is recessed to form an annular groove,
    wherein the rigid ring and the elastic ring are engaged and connected through the protrusion and the groove.

2. The assembly for preventing clamping stagnation of the valve rod according to claim 1, wherein a thickness of the elastic ring is greater than a thickness of the rigid ring.

3. A valve structure for preventing clamping stagnation of a valve rod, characterized in comprising an upper valve cover, a lower valve cover, a valve rod, and the assembly for preventing clamping stagnation of the valve rod according to claim 1;
    the upper valve cover and the lower valve cover are detachably connected and together form a valve cover assembly for closing a valve body; a vertical through hole is opened in a center of the valve cover assembly, and the valve rod is disposed with a gap in the through hole; an annular hole is coaxially opened for configuring the assembly for preventing clamping stagnation of the valve rod at a joint between the upper valve cover and the lower valve cover, and a top and a bottom of the assembly for preventing clamping stagnation of the valve rod are pressed against each other and limited through the upper valve cover and the lower valve cover; an outer wall of the elastic ring is an interference fit with an inner wall of the annular hole, and the rigid ring is sleeved on an outer wall of the valve rod and the joint is closed.

4. The valve structure for preventing clamping stagnation of the valve rod according to claim 3, wherein the upper valve cover and the lower valve cover are detachably connected by bolts.

5. The valve structure for preventing clamping stagnation of the valve rod according to claim 3, wherein a sealing ring is disposed at the joint between the upper valve cover and the lower valve cover.

6. The valve structure for preventing clamping stagnation of the valve rod according to claim 3, wherein the assembly for preventing clamping stagnation of the valve rod, the valve rod and the valve cover assembly are all disposed coaxially.

7. A method for preventing clamping stagnation of a valve rod using the valve structure according to claim 3, wherein:
    during an opening and closing process of a valve core, a flow of a fluid in a valve is unevenly distributed; the valve core is subjected to an unbalanced force of the fluid during a movement process, and an unbalanced torque is generated on a bottom surface; the valve core drives the valve rod to deflect under an action of the unbalanced torque to prevent squeezing from being generated at one side of the assembly for preventing clamping stagnation of the valve rod, thereby preventing the elastic ring of the assembly for preventing clamping stagnation of the valve rod from shrinking and deforming under pressure; while buffering the deflection of the valve rod, it prevents deformation caused by extrusion between the valve rod and a through hole wall in the valve cover assembly, thereby preventing clamping stagnation of the valve rod.

8. A method for preventing clamping stagnation of a valve rod using the valve structure according to claim 4, wherein:
during an opening and closing process of a valve core, a flow of a fluid in a valve is unevenly distributed; the valve core is subjected to an unbalanced force of the fluid during a movement process, and an unbalanced torque is generated on a bottom surface; the valve core drives the valve rod to deflect under an action of the unbalanced torque to prevent squeezing from being generated at one side of the assembly for preventing clamping stagnation of the valve rod, thereby preventing the elastic ring of the assembly for preventing clamping stagnation of the valve rod from shrinking and deforming under pressure; while buffering the deflection of the valve rod, it prevents deformation caused by extrusion between the valve rod and a through hole wall in the valve cover assembly, thereby preventing clamping stagnation of the valve rod.

9. A method for preventing clamping stagnation of a valve rod using the valve structure according to claim 5, wherein:
during an opening and closing process of a valve core, a flow of a fluid in a valve is unevenly distributed; the valve core is subjected to an unbalanced force of the fluid during a movement process, and an unbalanced torque is generated on a bottom surface; the valve core drives the valve rod to deflect under an action of the unbalanced torque to prevent squeezing from being generated at one side of the assembly for preventing clamping stagnation of the valve rod, thereby preventing the elastic ring of the assembly for preventing clamping stagnation of the valve rod from shrinking and deforming under pressure; while buffering the deflection of the valve rod, it prevents deformation caused by extrusion between the valve rod and a through hole wall in the valve cover assembly, thereby preventing clamping stagnation of the valve rod.

10. A method for preventing clamping stagnation of a valve rod using the valve structure according to claim 6, wherein:
during an opening and closing process of a valve core, a flow of a fluid in a valve is unevenly distributed; the valve core is subjected to an unbalanced force of the fluid during a movement process, and an unbalanced torque is generated on a bottom surface; the valve core drives the valve rod to deflect under an action of the unbalanced torque to prevent squeezing from being generated at one side of the assembly for preventing clamping stagnation of the valve rod, thereby preventing the elastic ring of the assembly for preventing clamping stagnation of the valve rod from shrinking and deforming under pressure; while buffering the deflection of the valve rod, it prevents deformation caused by extrusion between the valve rod and a through hole wall in the valve cover assembly, thereby preventing clamping stagnation of the valve rod.

11. A valve structure for preventing clamping stagnation of a valve rod, characterized in comprising an upper valve cover, a lower valve cover, a valve rod, and the assembly for preventing clamping stagnation of the valve rod according to claim 1;
the upper valve cover and the lower valve cover are detachably connected and together form a valve cover assembly for closing a valve body; a vertical through hole is opened in a center of the valve cover assembly, and the valve rod is disposed with a gap in the through hole; an annular hole is coaxially opened for configuring the assembly for preventing clamping stagnation of the valve rod at a joint between the upper valve cover and the lower valve cover, and a top and a bottom of the assembly for preventing clamping stagnation of the valve rod are pressed against each other and limited through the upper valve cover and the lower valve cover; an outer wall of the elastic ring is an interference fit with an inner wall of the annular hole, and the rigid ring is sleeved on an outer wall of the valve rod and the joint is closed.

12. A valve structure for preventing clamping stagnation of a valve rod, characterized in comprising an upper valve cover, a lower valve cover, a valve rod, and the assembly for preventing clamping stagnation of the valve rod according to claim 3;
the upper valve cover and the lower valve cover are detachably connected and together form a valve cover assembly for closing a valve body; a vertical through hole is opened in a center of the valve cover assembly, and the valve rod is disposed with a gap in the through hole; an annular hole is coaxially opened for configuring the assembly for preventing clamping stagnation of the valve rod at a joint between the upper valve cover and the lower valve cover, and a top and a bottom of the assembly for preventing clamping stagnation of the valve rod are pressed against each other and limited through the upper valve cover and the lower valve cover; an outer wall of the elastic ring is an interference fit with an inner wall of the annular hole, and the rigid ring is sleeved on an outer wall of the valve rod and the joint is closed.

* * * * *